(12) United States Patent
Ling et al.

(10) Patent No.: US 8,912,955 B2
(45) Date of Patent: Dec. 16, 2014

(54) TIME SYNCHRONIZATION WITH AMBIENT SOURCES

(75) Inventors: Curtis Ling, Carlsbad, CA (US); Anand Anandakumar, San Diego, CA (US)

(73) Assignee: MaxLinear, Inc., Carlsbad, CA (US)

( * ) Notice: Subject to any disclaimer, the term of this patent is extended or adjusted under 35 U.S.C. 154(b) by 674 days.

(21) Appl. No.: 13/098,314

(22) Filed: Apr. 29, 2011

(65) Prior Publication Data
US 2012/0105277 A1    May 3, 2012

Related U.S. Application Data

(60) Provisional application No. 61/329,314, filed on Apr. 29, 2010.

(51) Int. Cl.
| | | |
|---|---|---|
| *G01S 19/34* | (2010.01) | |
| *G01S 19/23* | (2010.01) | |
| *G01S 19/05* | (2010.01) | |
| *G01S 19/25* | (2010.01) | |
| *G01S 19/31* | (2010.01) | |

(52) U.S. Cl.
CPC ............. *G01S 19/05* (2013.01); *G01S 19/31* (2013.01); *G01S 19/256* (2013.01); *G01S 19/34* (2013.01)
USPC ............ 342/357.62; 342/357.63; 342/357.64; 342/357.65; 342/357.71

(58) Field of Classification Search
CPC ....... G01S 19/23; G01S 19/235; G01S 19/24; G01S 19/254; G01S 19/256; G01S 19/26; G01S 19/29; G01S 19/31; G01S 19/33; G01S 5/0263; G01S 5/0268; G01S 19/05; G01S 19/34

USPC ............ 342/357.62, 357.65, 357.71, 357.63, 342/357.64
See application file for complete search history.

(56) References Cited

U.S. PATENT DOCUMENTS

| | | | |
|---|---|---|---|
| 6,219,564 | B1 | 4/2001 | Grayson et al. |
| 6,985,811 | B2 | 1/2006 | Gronemeyer |
| 7,020,438 | B2 | 3/2006 | Sinivaara et al. |
| 7,474,260 | B2 | 1/2009 | Chen |
| 7,500,125 | B2 | 3/2009 | Yasumoto |
| 7,551,126 | B2 | 6/2009 | Loomis et al. |
| 7,852,262 | B2 | 12/2010 | Namineni et al. |

(Continued)

FOREIGN PATENT DOCUMENTS

| | | |
|---|---|---|
| WO | WO 98/59446 A1 | 12/1998 |
| WO | 2011/072273 A1 | 6/2011 |
| WO | WO 2011/066473 A1 | 6/2011 |
| WO | 2011/137392 A1 | 11/2011 |

OTHER PUBLICATIONS

Notice of Allowance for U.S. Appl. No. 12/965,805, mailed on May 10, 2013 in 6 pages.

(Continued)

*Primary Examiner* — Jack W Keith
*Assistant Examiner* — Chuong P Nguyen
(74) *Attorney, Agent, or Firm* — Kilpatrick Townsend & Stockton LLP (57) ABSTRACT

Systems and methods for extracting synchronization information from ambient signals, such as broadcast television signals, and using the synchronization information as a reference for correcting the local time base so that a GNSS positioning receiver system maintains relative time base accuracy with respect to a GNSS time.

35 Claims, 4 Drawing Sheets

(56) References Cited

U.S. PATENT DOCUMENTS

| | | | |
|---|---|---|---|
| 7,925,274 B2 | 4/2011 | Anderson et al. | |
| 8,558,738 B2 * | 10/2013 | Ladd et al. | 342/357.62 |
| 2003/0058834 A1 | 3/2003 | Soulie et al. | |
| 2004/0259571 A1 | 12/2004 | Joshi | |
| 2005/0195105 A1 | 9/2005 | McBurney et al. | |
| 2005/0233748 A1 | 10/2005 | Robinson et al. | |
| 2007/0001903 A1 | 1/2007 | Smith et al. | |
| 2008/0186166 A1 | 8/2008 | Zhou et al. | |
| 2009/0295631 A1 | 12/2009 | Wu et al. | |
| 2009/0322601 A1 | 12/2009 | Ladd et al. | |
| 2011/0025557 A1 | 2/2011 | Wang | |
| 2011/0187591 A1 | 8/2011 | Walker, Sr. | |
| 2011/0291882 A1 | 12/2011 | Walsh et al. | |
| 2011/0309976 A1 | 12/2011 | Leclercq et al. | |

OTHER PUBLICATIONS

International Search Report and Written Opinion for Application No. PCT/US2010/058120, mailed on Jan. 21, 2011, 15 pages.
International Search Report and Written Opinion for Application No. PCT/US2010/059974, mailed on Feb. 15, 2011, 28 pages.
International Search Report and Written Opinion for Application No. PCT/US2011/034668, mailed on Aug. 25, 2011, 13 pages.
International Preliminary Report on Patentability and Written Opinion for Application No. PCT/US2011/034668, mailed on Nov. 8, 2012, 8 pages.
Non-Final Office Action for U.S. Appl. No. 12/965,805, mailed on Aug. 1, 2012; 13 pages.
Final Office Action for U.S. Appl. No. 12/954,603, mailed Feb. 14, 2013, in 13 pages.
Non-Final Office Action for U.S. Appl. No. 12/954,603, mailed on Jun. 18, 2012; 13 pages.
International Preliminary Report on Patentability and Written Opinion for Application No. PCT/US2010/058120, mailed on Jun. 7, 2012, 8 pages.
International Preliminary Report on Patentability and Written Opinion for Application No. PCT/US2010/059974, mailed on Jun. 21, 2012, 8 pages.

\* cited by examiner

TIME SYNCHRONIZATION WITH AMBIENT SOURCES

CROSS-REFERENCES TO RELATED APPLICATIONS

The present application claims benefit under 35 U.S.C. §119(e) of U.S. Provisional Application No. 61/329,314, filed Apr. 29, 2010 the content of which is incorporated herein by reference in its entirety.

The present application is related to commonly assigned U.S. patent application Ser. No. 12/954,603, filed Nov. 24, 2010, and commonly assigned U.S. patent application Ser. No. 12/965,805, filed Dec. 10, 2010, the contents of both of which are incorporated herein by reference in their entirety.

BACKGROUND

The present invention relates generally to wireless communication systems, and more particularly to timing synchronization operations of Global Navigation Satellite Systems (GNSS).

The Global Positioning System (GPS) is a satellite-based navigation system which requires a very stable local timing reference to ensure accurate navigation of a user with a receiver. There are currently three GPS systems: the NAVSTAR Global Positioning System controlled by the United States Defense Department; the GLONASS maintained by the Russian Republic; and the GALILEO system proposed in Europe.

To decode these satellite signals, a GPS receiver first acquires the signals transmitted by a minimum number of satellites. GPS receives require a very accurate internal time base in order to lock on to the GPS signals and provide a location fix.

A GNSS system, such as a GPS system, often includes a module which continuously tracks an object's movement and reports the object's position to facilitate navigation. Conventional GNSS tracking devices require relatively high power to support intermittent tracking applications. In battery powered devices, such as digital cameras that have tracking capability to tag the pictures with their corresponding locations, low power consumption is highly desirable.

Accordingly, there is a need to lower the power consumption and provide a faster location fix of GPS receivers. The present invention provides a technical solution to reduce the power consumption and simultaneously enable a fast location fix time

BRIEF SUMMARY

The present invention relates generally to wireless communication systems, and more particularly to timing synchronization operations of Global Navigation Satellite Systems (GNSS).

According to one embodiment of the present invention, a GNSS system includes a GNSS receiver configured to establish a GNSS time and an ambient signal receiver. The ambient signal receiver includes: (i) a search module configured to search for a multitude of ambient signals, (ii) a detector module configured to detect signal types of the multitude of ambient signals, and (iii) a stability assessing module configured to assess a time base stability of each of the multitude of ambient signals.

According to one specific embodiment, the GNSS receiver and the ambient signal receiver share an antenna. According to another specific embodiment, the GNSS receiver and the ambient signal receiver are coupled to separate antennas. According to another specific embodiment, the search module includes a frequency scanner configured to scan a set of frequencies. According to another specific embodiment, the detector module includes a signal comparator configured to compare the multitude of ambient signals with a set of known signals.

According to another specific embodiment, the stability assessing module includes a stability discriminator configured to determine the time base stability of each of the multitude of ambient signals within a predetermined range of the GNSS time. The stability assessing module further includes a signal characteristics assessor circuitry configured to determine a multitude of signal characteristics associated with each of the multitude of ambient signals having the time base stability within the predetermined range of the GNSS time.

According to another specific embodiment, the ambient signal receiver further includes a database configured to store the multitude of signal characteristics. According to another specific embodiment, the database includes a predetermined multitude of signal characteristics associated with a geographic region. According to another specific embodiment, the database is coupled to the ambient signal receiver by a network. According to another specific embodiment, the database is a local database. According to another specific embodiment, the database is configured to be updated by a network.

According to another specific embodiment, the ambient signal receiver operates the search module, the detector module, and the stability assessing module. The ambient signal receiver stores the multitude of signal characteristics associated with each of the multitude of ambient signals in the event that the time base stability associated with each of the multitude of ambient signals is within the predetermined range of the GNSS time. The ambient signal receiver does not store the multitude of signal characteristics associated with each of the multitude of ambient signals in the event that the time base stability associated with each of the multitude of ambient signals is not within the predetermined range of the GNSS time.

According to another specific embodiment, the ambient signal receiver operates periodically. According to another specific embodiment, the ambient signal receiver operates continuously.

According to another specific embodiment, to correct a local time base, the ambient signal receiver: (i) selects a suitable ambient signal from the multitude of ambient signals stored in the database, (ii) tunes to the suitable ambient signal, (iii) assesses signal characteristics of the tuned ambient signal, (iv) assesses a Doppler shift between the tuned ambient signal source and the local time base, (v) determines a difference between expected timing characteristics and assessed signal characteristics, and (vi) corrects the local time base based on the difference.

According to another specific embodiment, the suitable ambient signal includes a suitable time base stability that has a least mean variation value of the GNSS time. According to another specific embodiment, the ambient signal receiver further includes a timing module configured to wake up the ambient signal receiver intermittently at a predetermined time interval. According to another specific embodiment, the predetermined time interval includes a fixed time period. According to another specific embodiment, the predetermined time interval includes a variable time period.

According to another specific embodiment, the ambient signal receiver, while in the wake-up mode: (i) selects a suitable ambient signal from the multitude of ambient signals stored in the database, (ii) tunes to the suitable ambient signal, (iii) assesses signal characteristics of the tuned ambient signal, (iv) determines a difference between expected timing characteristics and assessed signal characteristics, and (v) corrects a local time base based on the difference.

According to one embodiment of the present invention, a computer-readable media embodying instructions executable by a processor to perform a method of determining stable local time bases includes: (i) establishing a GNSS time, (ii) searching a multitude of ambient signals, (ii) detecting signal types of the multitude of ambient signals; and (iii) assessing a time base stability of each of the multitude of ambient signals.

According to one specific embodiment, the searching a multitude of ambient signals includes scanning a set of frequencies. According to another specific embodiment, the detecting the signal types includes comparing the multitude of ambient signals with a set of known signals.

According to another specific embodiment, the assessing the time base stability includes: (i) comparing the time base stability of each of the multitude of ambient signals with the GNSS time; and (ii) determining a multitude of signal characteristics associated with each of the multitude of ambient signals if the time base stability of each of the multitude of ambient signals is within a predetermined range.

According to another specific embodiment, the computer-readable media further includes a data base configured to store the multitude of signal characteristics. According to another specific embodiment, the data base includes a predetermined multitude of signal characteristics associated with a geographic region.

According to another specific embodiment, in order to correct a local time base, the computer-readable media further includes: (i) selecting a suitable ambient signal from the multitude of ambient signals stored in the database, (ii) tuning to the suitable ambient signal, (iii) assessing signal characteristics of the tuned ambient signal, (iv) determining a difference between expected timing characteristics and assessed signal characteristics, and (v) correcting the local time base based on the difference.

According to another specific embodiment, in order to reduce power consumption, the computer-readable media further includes: (i) waking up periodically at a predetermined time interval, (ii) selecting a suitable ambient signal from the multitude of ambient signals stored in the database, (iii) tuning to the suitable ambient signal, (iv) assessing signal characteristics of the tuned ambient signal, (v) determining a difference between expected timing characteristics and assessed signal characteristics, (vi) correcting the local time base based on the difference; and (vii) entering a sleep state.

According to one embodiment of the present invention, a method includes: (i) receiving a GNSS signal to establish a GNSS time; (ii) searching for a multitude of ambient signals, (iii) detecting signal types of the multitude of ambient signals, and (iv) determining a time base stability of each of the multitude of ambient signals.

A better understanding of the nature and advantages of the embodiments of the present invention may be gained with reference to the following detailed description and the accompanying drawings.

DETAILED DESCRIPTION

One of the key challenges in GNSS positioning systems is to maintain a stable local time base. According to the embodiments of the present invention, a stable time base helps improve positioning systems in the following ways.

First, a stable time base allows for longer integration times during the acquisition and tracking of satellite signals. Second, a stable time base allows for precise, rapid acquisition and fixes, e.g. time to first fix. The precise, rapid acquisition and fixes result because a stable time base allows the system to avoid searching large ranges of frequency or code phase space for each satellite. Third, a stable time base may be desirable for a GNSS system to reduce system power consumption by applying a duty cycle to the system's activity. That is, the system may enter a reduced-power state (alternatively referred to herein as "sleep state") where little or no tracking activity is being performed; and periodically interrupting the reduced-power state to perform tracking or position fix activities, e.g. acquiring and tracking GNSS satellites, and calculating position-velocity-time (PVT) fixes.

In this disclosure, the mode of operation described above is referred to as intermittent tracking and positioning (ITP). In the ITP mode, local time base stability is useful since the system may have to wake up before local time drifts beyond an acceptable range, in order to ensure that the system maintains satellite lock. If a very stable local time base is available, the system may maintain the sleep state for a longer period of time and remain immune to time base drift which would cause GNSS synchronization (either frequency or code phase) to drift beyond the range required for a rapid lock for tracking or PVT fix.

Embodiments of the present invention describe systems and methods for extracting synchronization information from ambient signals that are acquired more readily than GNSS signals, including for example broadcast television (TV) signals, and using the synchronization information as a reference for correcting the local time base so that the GNSS receiver system maintains relative accuracy with respect to GNSS time.

More specifically, embodiments of the present invention include RF carriers, symbol timing, and other signal markers extracted from or provided by an ambient source to provide a means to stabilize and calibrate a local time base, and a means for assuring that the ambient source is substantially synchronized to a very stable timing reference (such as GNSS time). Other embodiments of the present the present invention include a single antenna to receive both GNSS and other ambient signals, such as broadcast TV signals. In addition, embodiments of the present invention include a single receiver adapted to receive both GNSS and ambient signals, where the receiver input may be switched to bypass any filters present for GNSS reception purposes.

In the following, it is understood that:

Ambient signals refer to signal sources such as wireless sources that may include broadcast television, radio towers, cellular base stations, or other sources synchronized to stable time bases, wherein the stable time bases typically broadcast their precise location and time.

Digital Video Broadcasting—Terrestrial (DVB-T), Digital Video Broadcasting—Handheld (DVB-H), Integrated Service Digital Broadcasting—Terrestrial (ISDB-T), China Multimedia Mobile Broadcasting (CMMB), Media Forward Link Only (MediaFLO™) and Advanced Television Systems Committee (ATSC) broadcast standards are collectively referred to herein as digital TV (DTV) or DTV standards, though other broadcast systems such as Digital Audio Broadcasting (DAB), or digital radio, also may accommodate the invention described herein.

Cellular signals from any number of standard systems such as Global System for Mobile Communications (GSM), 3rd generation mobile telecommunications (3G), or Code division multiple access (CDMA), may be included, and are herein collectively referred to as cell signals, and the base stations are referred to as cell base stations.

Ambient signals may also be produced by data standards such as WiFi/802.11abgn, Worldwide Interoperability for Microwave Access (WiMax), Whitespace, and so on.

The term "ambient signal" may also herein refer to signal markers that are transmitted in the ambient signal.

Signal markers (alternatively referred to herein as markers) herein refer to signal characteristics that are known or may be estimated using a priori knowledge of the signal, and may be included for determining time-of-arrival and frequency of the transmitted signal, as well as other characteristics such as the channel that the signal passes through.

Global Navigation Satellite Systems (GNSS) refers to conventional geo-location systems relying on satellites and trilateration, and includes the Global Positioning System (GPS) system.

Time base herein refers to some kind of clock reference such as a crystal, Temperature Compensated Crystal Oscillator (TCXO) or atomic clock, which provides a device with a measure of the passage of time.

Geo-location herein refers to three-dimensional position coordinates, e.g. (x, y, z) of a device, or the act of obtaining those coordinates. Geo-location may also include time. Geo-location may optionally include other incidental information such as velocity, wherein the resulting location fix is often referred to as a position-velocity-time (PVT) fix.

Trilateration herein refers to the process of using pseudo-ranges from several sources to establish user position, speed, and/or elevation.

GNSS time herein refers to time that is referenced to a globally-available standard time such as provided in GNSS systems like GPS.

Time of flight herein refers to the time taken for a signal to transit from one point to another, e.g. transmission from a tower to reception on a device elsewhere.

Earliest time of arrival refers to the shortest time of flight of a signal, and usually corresponds to the shortest distance between two points. Because the signal may contain multipath reflections from other objects in the environment, a system needs to perform some kind of calculation to estimate the earliest time of arrival.

Pseudo-range is commonly understood to be an approximation of the distance between a satellite and a navigation device, e.g. in a GPS or other GNSS system. Pseudo-range is often calculated by estimating time of flight from a transmitter to a receiver. The estimate usually includes a number of sources of error due to timing drift.

Figure 1:
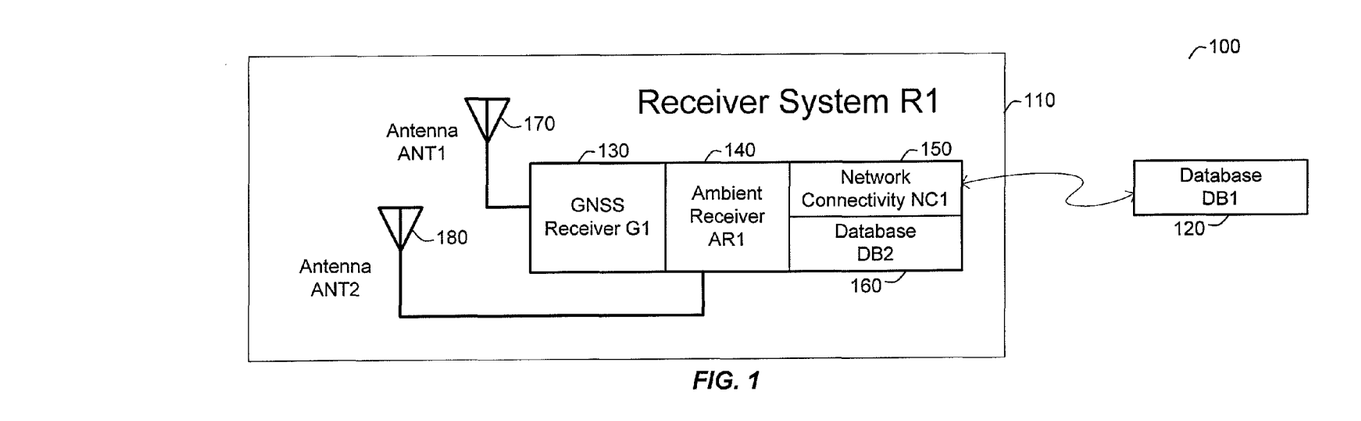
FIG. 1 is a simplified block diagram of a GNSS positioning receiver system according to an embodiment of the present invention.

FIG. 1 is a simplified block diagram of a GNSS positioning receiver system 100 including a receiver system R1 110 and a database DB1 120 in accordance with an embodiment of the present invention. Database DB1 120 may be located remotely from the receiver system R1. Receiver system R1 110 includes a GNSS receiver G1 130, an ambient signal receiver AR1 140, network connectivity NC1 150, database DB2 160, antenna ANT1 170, and antenna ANT2 180. GNSS receiver G1 130 may be configured to establish a GNSS time. Ambient signal receiver AR1 140 may be a broadcast TV, cellular or WiMax receiver. Database DB2 160 is a local database in receiver system R1 110. Network connectivity NC1 may be wireless or wireline, and connects to the database DB1. Database DB1 120 and/or database DB2 160 may be updated via the network. GNSS receiver G1 130 receives GNSS signals from antenna ANT1 170. Ambient signal receiver AR1 140 receives ambient signals from antenna ANT2 180. GNSS positioning receiver system 100 may receive ambient signals for time base stabilization as described in greater detail below.

Figure 2:
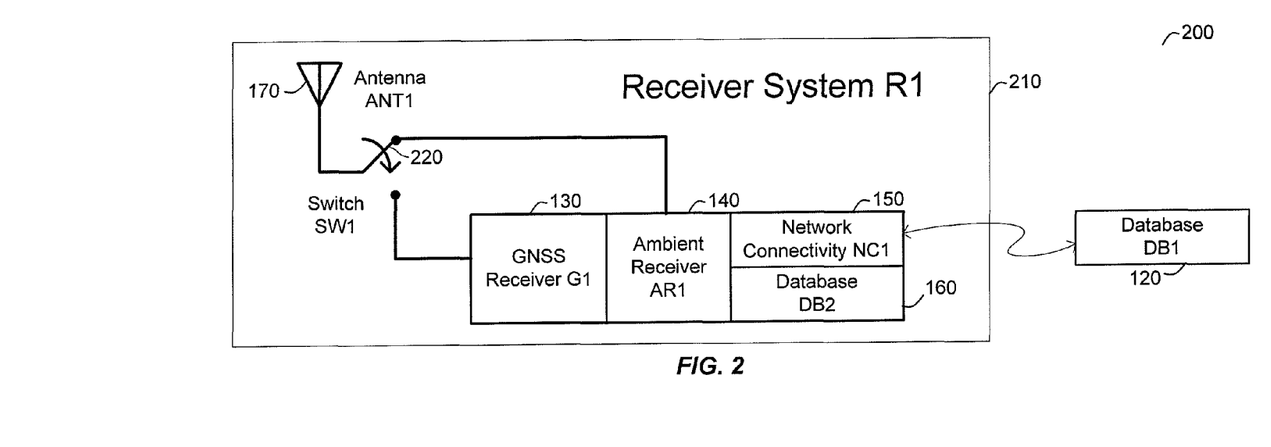
FIG. 2 is a simplified block diagram of a GNSS positioning receiver system according to an alternative embodiment of the present invention.

FIG. 2 is a simplified block diagram of a GNSS positioning receiver system 200 including a receiver system R1 210 and database DB1 120 according to an alternative embodiment of the present invention. Many elements shown in FIG. 2 are the same elements as shown in FIG. 1 and will not be described in detail because their structures and operations are similar except as noted below. FIG. 2 shows that receiver system R1 210 includes a switch SW1 220, that allows GNSS receiver G1 130 and ambient signal receiver AR1 140 to share antenna ANT1 170, thereby reducing the cost, size, and complexity of the receiver system R1. In another embodiment, other ambient signal receivers may be added to the configuration described above to receive a multiplicity of ambient signals simultaneously.

In an embodiment of the present invention, ambient signal receiver AR1 140 detects and characterizes ambient signals. Ambient signal receiver AR1 further identifies the ambient signals that are suitable as a time base reference, and periodically and/or continuously tunes to those ambient signals to correct drift in a local time base, depending on the power and accuracy requirements of the application. Various operating modes may be included to correct drift in the local time base. In one implementation, GNSS receiver G1 is locked to a sufficient number of satellites to establish a GNSS time, and includes the GNSS time to determine which ambient signals originate from sources with stable time bases.

Figure 3:
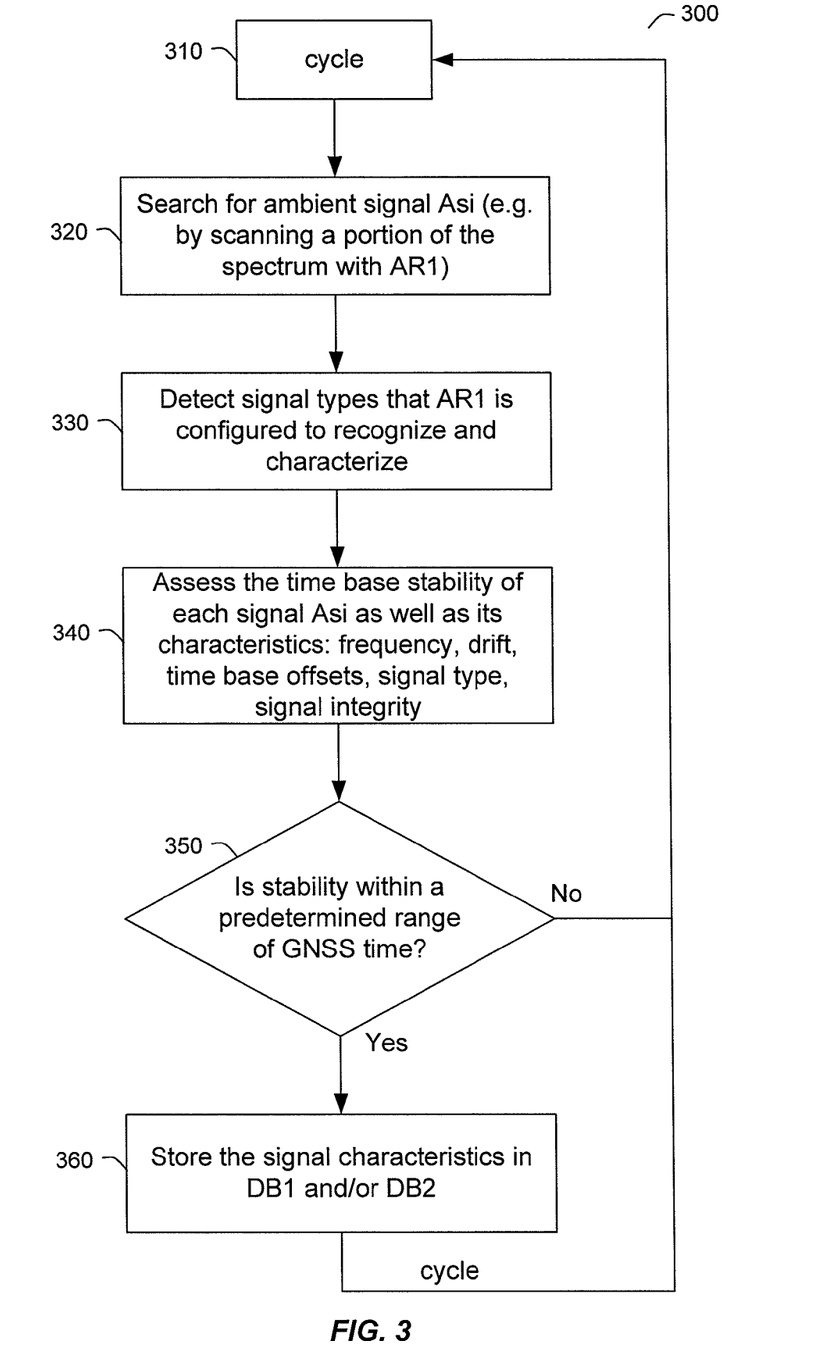
FIG. 3 is a flow chart showing a method for assessing the time base stability of ambient signals according to an embodiment of the present invention.

FIG. 3 is a flow chart showing a method 300 for assessing the time base stability of ambient signals according to an embodiment of the present invention. GNSS positioning receiver system 100 or GNSS positioning receiver system 200 may perform the following activities to characterize the ambient signal. At step 310, a cycle operation begins. At step 320, ambient signal receiver AR1 140 searches for ambient signals, Asi, either using database DB2 and/or DB1, scanning a set of frequencies, or scanning a portion of the spectrum. At step 330, at each Asi frequency, ambient signal receiver AR1 140 attempts to detect the presence of known signal types that the ambient signal receiver AR1 is configured to recognize and characterize. At step 340, if known signals are present, the ambient signal receiver AR1 assesses the time base stability of each signal Asi relative to the GNSS time. Ambient signal receiver AR1 may also assesses other characteristics such as frequency, drift, time base offsets, signal type, signal integrity, and/or signal strength. At step 350, ambient signal receiver AR1 determines if the time base for each signal Asi is stable within a predetermined range of GNSS time. If no stable Asi are found, ambient signal receiver AR1 may cycle back to step 310 to continue the search for stable Asi. At step 360, for each signal Asi, which is deemed to be sufficiently stable, ambient signal receiver AR1 stores the signal characteristics in databases DB1 and/or DB2. After step 360, ambient signal receiver AR1 may cycle back to step 310.

Database DB1 may be pre-populated with signal characteristics for a given geographic region, and ambient signal receiver AR1 may rely on the stored signal characteristics data to minimize or eliminate the processing during the ambient signal assessment and characterization operation mode. Estimation of the Doppler frequency between receiver system R1 110 (or 210) and the ambient source may be estimated. For example, pilot tones or training sequences in the ambient signal may be included to estimate the carrier frequency offset. The pilot tones or training sequences may be included to estimate the Doppler frequency between the receiver system R1 and the tower by measuring the rate of change of the pilots or by measuring the rate of change of phase and amplitude of the pilots. Frequency error in the local time base (ppm error in the local time base) may be calculated by using the carrier frequency offset and subtracting from that the Doppler frequency between the receiver system R1 and the tower.

Figure 4:
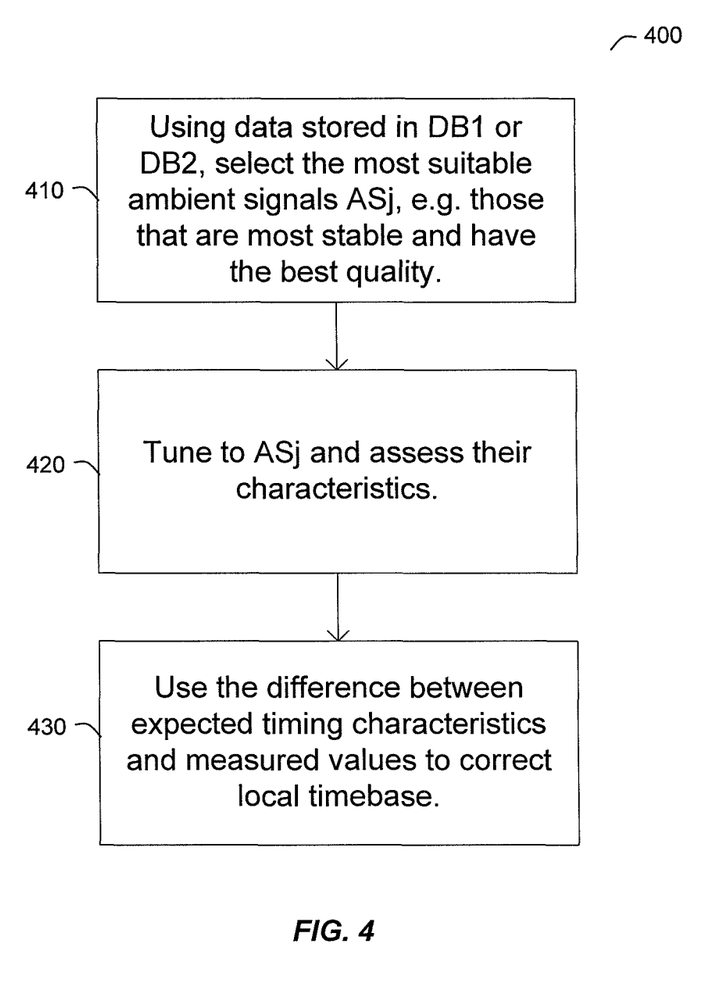
FIG. 4 is a flow chart showing a method for continuously correcting a local time base according to an embodiment of the present invention.

FIG. 4 is a flow chart showing a method 400 for continuously correcting a local time base according to an embodiment of the present invention. Using the stable ambient signals Asi obtained from the characterization described above, ambient signal receiver AR1 may further perform the following activities in a continuous manner to improve the local time base. At step 410, using the data stored in DB1 and/or DB2, ambient signal receiver AR1 selects the most suitable ambient signal, Asj, e.g. those Asj that are most stable and have the best quality. At step 420, ambient signal receiver AR1 tunes to the selected Asj and assesses their characteristics. At step 430, the local time base is corrected using the difference between the expected timing characteristics and the measured timing values.

In one embodiment, method 400 may be done if GNSS receiver G1 130 is continuously operating and is employing long integration times to improve sensitivity. In the continuous correction mode, ambient signal receiver AR1 is being operated as frequently as is necessary to provide sufficiently stable time base for the integration times desired by GNSS receiver G1 130. In a second embodiment, method 400 may be done in a frequency-lock mode where the frequencies of the ambient signals are included to adjust the frequency of the local time base. In a third embodiment, method 400 may be done in phase-lock mode, where ambient signal receiver AR1 receives the ambient signals at intervals sufficiently frequently to be able to track the phase of the ambient signals and adjusts the phase of the local time base accordingly.

In another embodiment of the present invention, ambient signal receiver AR1, using the stable ambient signals obtained from the characterization described above, may perform in an intermittent tracking and positioning operation (ITP) by waking up periodically to resynchronize the local time base with the stable ambient signals Asi. The intermittent operation significantly reduces power consumption of the overall system.

Figure 5:
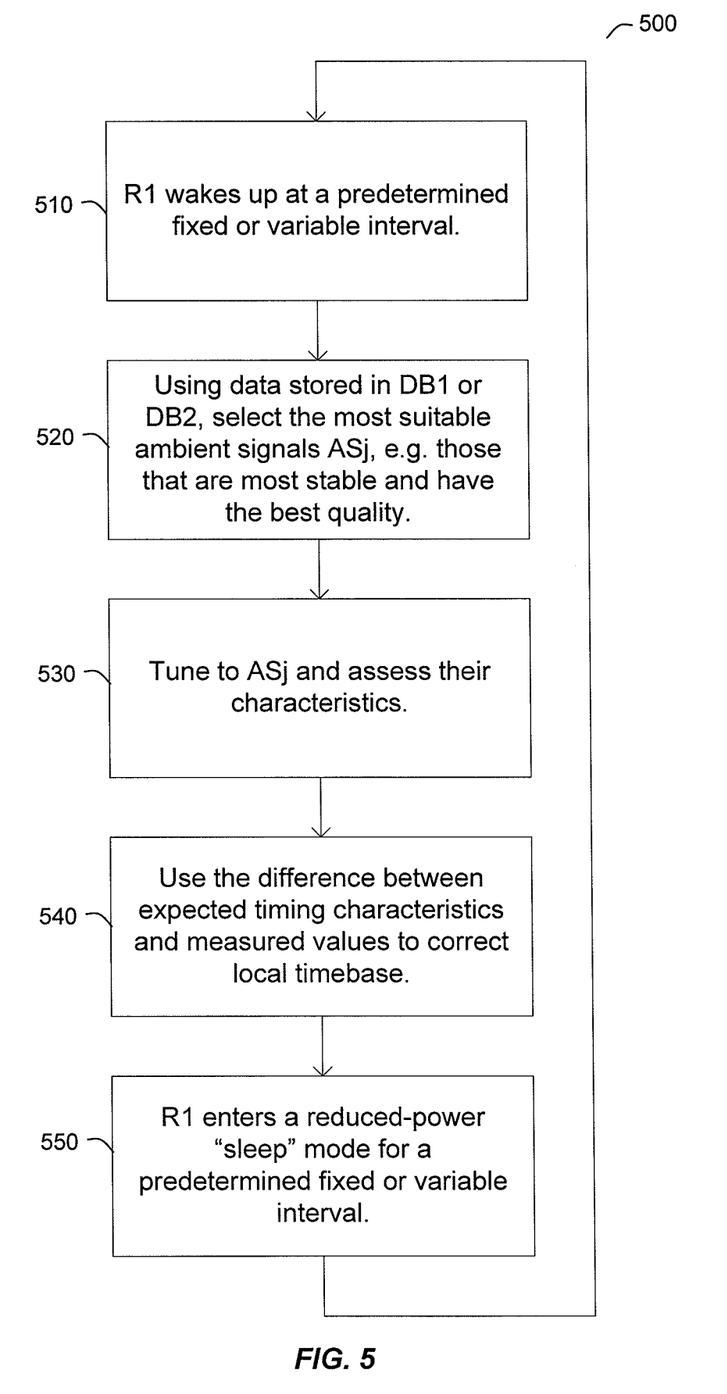
FIG. 5 is a flow chart showing a method for intermittently correcting a local time base according to an embodiment of the present invention.

FIG. 5 is a flow chart showing a method 500 for intermittently correcting a local time base according to an embodiment of the present invention. GNSS positioning receiver system 100 or GNSS positioning receiver system 200 may perform the following activities to reduce power. At step 510, the receiver system R1 110 (or 210) wakes up at a predetermined fixed or variable interval. Steps 520-540 correspond to steps 410-430 described in reference to FIG. 4. Referring to FIG. 5, at step 550, receiver system R1 110 (or 210) enters a reduced power "sleep" mode for a predetermined fixed or variable interval.

Embodiments of the present invention include several methods to maintain an accurate time base update or recover ambient signal timing using the ambient signals received by ambient signal receiver AR1. With ATSC signals, the pilot tone for a channel may be extracted through conversion and filtering techniques and included to calibrate the accuracy of a local time base, e.g. by measuring the ATSC signal frequency against an expected value, and using the difference to correct for local time base errors. With an Orthogonal Frequency-Division Multiplexing (OFDM) physical layer, such as is the case for DVB-T signals, the fixed and/or scattered pilots may be included individually or in combination to determine frequency offset of the local time base.

A number of implementations of the present invention have been described. It will be understood that various modifications may be made without departing from the spirit and scope of the present invention. Accordingly, other implementations are within the scope of the following claims.

What is claimed is:

1. A GNSS system comprising:
a GNSS receiver configured to establish a GNSS time; and
an ambient signal receiver configured to:
search for a plurality of ambient signals;
detect signal types of the plurality of ambient signals; and
assess a time base stability of each of the plurality of ambient signals, wherein the ambient signal receiver stores a plurality of signal characteristics associated with each of the plurality of ambient signals in the event that the time base associated with each of the plurality of ambient signals is within a predetermined phase stability, and does not store the plurality of signal characteristics associated with each of the plurality of ambient signals in the event that the time base associated with each of the plurality of ambient signals is not within the predetermined phase stability.

2. The GNSS system of claim 1 wherein the GNSS receiver and the ambient signal receiver are coupled to a same antenna.

3. The GNSS system of claim 1 wherein the GNSS receiver and the ambient signal receiver are coupled to different antennas.

4. The GNSS system of claim 1 wherein the ambient signal receiver searches for the plurality of ambient signals by scanning a set of frequencies.

5. The GNSS system of claim 1 wherein the ambient signal receiver detects the signal types of the plurality of ambient signals by comparing the plurality of ambient signals with a set of known signals.

6. The GNSS system of claim 1 wherein the ambient signal receiver is further configured to identify an ambient signal as having a stable time base if the time base of the ambient signal falls within a predetermined phase stability.

7. The GNSS system of claim 1 wherein the GNSS system further comprises a database configured to store a plurality of signal characteristics.

8. The GNSS system of claim 7 wherein the database stores a predetermined plurality of signal characteristics associated with a geographic region.

9. The GNSS system of claim 1 wherein the GNSS system is in communications with a database via a network.

10. The GNSS system of claim 9 wherein the database is configured to be updated by the network.

11. The GNSS system of claim 1 wherein the ambient signal receiver operates periodically.

12. The GNSS system of claim 1 wherein the ambient signal receiver operates continuously.

13. The GNSS system of claim 1 wherein the ambient signal receiver the GNSS system is further configured to:
   select an ambient signal from the plurality of ambient signals stored in a database; and
   correct the local time base in accordance with a difference between the local time base and the selected ambient signal.

14. The GNSS system of claim 13 wherein a deviation of the time base of the selected ambient signal is smaller than deviations of the ambient signals not selected from the plurality of ambient signals.

15. The GNSS system of claim 1 wherein the ambient signal receiver is further configured to enter a sleep mode intermittently at a predetermined time interval.

16. The GNSS system of claim 15 wherein the predetermined time interval comprises a fixed time period.

17. The GNSS system of claim 15 wherein the predetermined time interval comprises a variable time period.

18. A method of processing a signal comprising:
   receiving a GNSS signal to establish a GNSS time;
   searching for a plurality of ambient signals;
   detecting signal types of the plurality of ambient signals; and
   assessing a time base stability of each of the plurality of ambient signals
   storing a plurality of signal characteristics associated with the plurality of ambient signals in the event that the time base associated with the plurality of ambient signals falls within a predetermined phase stability; and
   not storing the plurality of signal characteristics associated with the plurality of ambient signals in the event that the time base associated with the plurality of ambient signals does not fall within the predetermined phase stability.

19. The method of claim 18 further comprising receiving the GNSS signal and the plurality of ambient signals via a same antenna.

20. The method of claim 18 further comprising receiving the GNSS signal and the plurality of ambient signals via different antennas.

21. The method of claim 18 further comprising receiving the plurality of ambient signals by scanning a set of frequencies.

22. The method of claim 18 further comprising detecting signal types of the plurality of ambient signals by comparing the plurality of ambient signals with a set of known signals.

23. The method of claim 18 further comprising identifying an ambient signal as having a stable time base if the time base of the ambient signal falls within a predetermined phase stability.

24. The method of claim 18 further comprising storing a plurality of signal characteristics in a database.

25. The method of claim 24 wherein the database maintains communications with a receiver receiving the plurality of ambient signals via a network.

26. The method of claim 25 wherein the database is updated via the network.

27. The method of claim 24 wherein the database is local to a receiver receiving the plurality of ambient signals.

28. The method of claim 24 wherein the database comprises a predetermined plurality of signal characteristics associated with a geographic region.

29. The method of claim 18 wherein a receiver receiving the plurality of ambient signal operates periodically.

30. The method of claim 18 wherein a receiver receiving the plurality of ambient signal operates continuously.

31. The method of claim 18 further comprising:
   selecting an ambient signal from the plurality of ambient signals stored in a database; and
   correcting the local time base in accordance with a difference between the local time base and the selected ambient signal.

32. The method of claim 31 further comprising:
   selecting an ambient signal from the plurality of ambient signals having a smallest time base deviation.

33. The method of claim 18 further comprising:
   causing a receiver receiving the plurality of ambient signals to enter a sleep mode intermittently at a predetermined time interval.

34. The method of claim 33 wherein the predetermined time interval comprises a fixed time period.

35. The method of claim 33 wherein the predetermined time interval comprises a variable time period.

* * * * *